United States Patent
Chauhan et al.

(10) Patent No.: US 11,934,284 B2
(45) Date of Patent: Mar. 19, 2024

(54) METHOD AND SYSTEM FOR SYNTHETIC APPLICATION MONITORING

(71) Applicant: JPMorgan Chase Bank, N.A., New York, NY (US)

(72) Inventors: Bhoopendra Chauhan, Thane (IN); Connor Basilici, Wayne, PA (US); Jassi Singh, Short Hills, NJ (US); Ravindra P Padma, Glen Mills, PA (US); Rohan Reddy Alluri, Wilmington, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 154 days.

(21) Appl. No.: 17/455,302

(22) Filed: Nov. 17, 2021

(65) Prior Publication Data
US 2023/0106381 A1      Apr. 6, 2023

(30) Foreign Application Priority Data
Oct. 5, 2021   (IN) .............................. 202111045238

(51) Int. Cl.
| | |
|---|---|
| G06F 11/00 | (2006.01) |
| G06F 11/30 | (2006.01) |
| G06F 11/32 | (2006.01) |
| G06F 11/34 | (2006.01) |
| G06N 20/00 | (2019.01) |

(52) U.S. Cl.
CPC ........ *G06F 11/302* (2013.01); *G06F 11/3051* (2013.01); *G06F 11/327* (2013.01); *G06F 11/328* (2013.01); *G06F 11/3457* (2013.01); *G06F 11/3466* (2013.01); *G06N 20/00* (2019.01)

(58) Field of Classification Search
CPC .. G06F 11/3466; G06F 11/323; G06F 11/302; G06F 11/3476; G06F 11/3072; G06F 11/3006
See application file for complete search history.

(56) References Cited

U.S. PATENT DOCUMENTS

| | | | | |
|---|---|---|---|---|
| 2003/0055883 | A1* | 3/2003 | Wiles, Jr. | ................ H04L 67/01 709/217 |
| 2007/0069005 | A1* | 3/2007 | Dickerson | .............. G06Q 30/06 235/379 |
| 2015/0012647 | A1* | 1/2015 | Grelewicz | ............... H04L 41/22 709/224 |

* cited by examiner

*Primary Examiner* — Charles Ehne
(74) *Attorney, Agent, or Firm* — Greenblum & Bernstein, P.L.C.

(57) ABSTRACT

A method for providing end-to-end monitoring of an application is disclosed. The method includes receiving, via a graphical user interface, a request to monitor the application, the request including information relating to the application; generating a service call based on the request, the service call relating to a synthetic transaction in a master configuration; scheduling the service call in the master configuration; generating a synthetic workflow based on the service call; executing the synthetic workflow based on a result of the scheduling; and capturing a metric from the executed synthetic workflow.

16 Claims, 6 Drawing Sheets

METHOD AND SYSTEM FOR SYNTHETIC APPLICATION MONITORING

CROSS-REFERENCE TO RELATED APPLICATIONS

This application claims the benefit of Indian Provisional Patent Application No. 202111045238, filed Oct. 5, 2021, which is hereby incorporated by reference in its entirety.

BACKGROUND

1. Field of the Disclosure

This technology generally relates to methods and systems for application monitoring, and more particularly to methods and systems for providing end-to-end monitoring of an application by using synthetic service calls and key performance indicators.

2. Background Information

Many business entities utilize expansive application networks to provide services for users. Often, frequent monitoring of the application networks is required to ensure optimal functionality. Historically, conventional techniques for monitoring the application networks have resulted in varying degrees of success with respect to effective continuous monitoring on an application-to-application level even when there are no real users accessing the application networks.

One drawback of conventional techniques for monitoring the application networks is that in many instances, synthetic monitoring of the application networks is only available at a user interface level. As a result, anomalies occurring in between each of the downstream nodes are not readily detectable. Additionally, the conventional techniques for monitoring the application networks do not facilitate on demand synthetic monitoring as well as automated synthetic monitoring and alerting.

Therefore, there is a need for a synthetic monitoring technique that provides end-to-end monitoring of the application networks at the application-to-application level by using synthetic service calls and key performance indicators.

SUMMARY

The present disclosure, through one or more of its various aspects, embodiments, and/or specific features or sub-components, provides, inter alia, various systems, servers, devices, methods, media, programs, and platforms for providing end-to-end monitoring of an application by using synthetic service calls and key performance indicators.

According to an aspect of the present disclosure, a method for providing end-to-end monitoring of an application is disclosed. The method is implemented by at least one processor. The method may include receiving, via a graphical user interface, at least one request to monitor the application, the at least one request may include information relating to the application; generating at least one service call based on the at least one request, the at least one service call may relate to a synthetic transaction in a master configuration; scheduling the at least one service call in the master configuration; generating at least one synthetic workflow based on the at least one service call; executing the at least one synthetic workflow based on a result of the scheduling; and capturing at least one metric from the executed at least one synthetic workflow.

In accordance with an exemplary embodiment, the method may further include determining at least one performance metric for the application based on the at least one captured metric; comparing the at least one performance metric with at least one predetermined threshold that is associated with the application; and generating at least one service ticket for the application based on a result of the comparison.

In accordance with an exemplary embodiment, the at least one predetermined threshold may be dynamically determined for the application by using at least one model, the at least one model may include at least one from among a machine learning model, a statistical model, a mathematical model, a process model, and a data model.

In accordance with an exemplary embodiment, the method may further include aggregating data that corresponds to the application, the data may include at least one from among known incident data and known change data; and determining, by using the data, at least one predicted factor that contributes to generation of the at least one service ticket.

In accordance with an exemplary embodiment, the method may further include generating at least one alert when the at least one service ticket is generated, the at least one alert may include information that relates to at least one from among the at least one performance metric, the application, the at least one predetermined threshold, and the at least one predicted factor; identifying at least one administrator associated with the application; and transmitting, via an application programming interface, the at least one alert to the at least one administrator.

In accordance with an exemplary embodiment, for scheduling the at least one service call, the method may further include parsing the at least one service call to identify a corresponding protocol type; categorizing the corresponding protocol type; and scheduling the at least one service call in the master configuration based on the categorized protocol type.

In accordance with an exemplary embodiment, for capturing the at least one metric, the method may further include capturing at least one key performance indicator metric from the executed at least one synthetic workflow; associating the at least one key performance indicator metric with the at least one service call; and persisting, in a repository, the at least one key performance indicator metric and a result of the associating together with the at least one service call.

In accordance with an exemplary embodiment, the at least one key performance indicator metric may include at least one from among a transaction performance metric that relates to the synthetic transaction and a system performance metric that relates to a corresponding downstream system.

In accordance with an exemplary embodiment, the at least one request may include a predetermined time interval to automatically generate the at least one service call, the predetermined time interval may relate to a user setting that is received via the graphical user interface.

In accordance with an exemplary embodiment, the at least one metric may be captured at each downstream node that corresponds to the at least one service call.

According to an aspect of the present disclosure, a computing device configured to implement an execution of a method for providing end-to-end monitoring of an application is disclosed. The computing device comprising a processor; a memory; and a communication interface coupled to each of the processor and the memory, wherein the processor may be configured to receive, via a graphical user interface, at least one request to monitor the application, the at least one request may include information relating to the application; generate at least one service call based on the at least one request, the at least one service call may relate to a synthetic transaction in a master configuration; schedule the at least one service call in the master configuration; generate at least one synthetic workflow based on the at least one service call; execute the at least one synthetic workflow based on a result of the scheduling; and capture at least one metric from the executed at least one synthetic workflow.

In accordance with an exemplary embodiment, the processor may be further configured to determine at least one performance metric for the application based on the at least one captured metric; compare the at least one performance metric with at least one predetermined threshold that is associated with the application; and generate at least one service ticket for the application based on a result of the comparison.

In accordance with an exemplary embodiment, the processor may be further configured to dynamically determine the at least one predetermined threshold for the application by using at least one model, the at least one model may include at least one from among a machine learning model, a statistical model, a mathematical model, a process model, and a data model.

In accordance with an exemplary embodiment, the processor may be further configured to aggregate data that corresponds to the application, the data may include at least one from among known incident data and known change data; and determine, by using the data, at least one predicted factor that contributes to generation of the at least one service ticket.

In accordance with an exemplary embodiment, the processor may be further configured to generate at least one alert when the at least one service ticket is generated, the at least one alert may include information that relates to at least one from among the at least one performance metric, the application, the at least one predetermined threshold, and the at least one predicted factor; identify at least one administrator associated with the application; and transmit, via an application programming interface, the at least one alert to the at least one administrator.

In accordance with an exemplary embodiment, for scheduling the at least one service call, the processor may be further configured to parse the at least one service call to identify a corresponding protocol type; categorize the corresponding protocol type; and schedule the at least one service call in the master configuration based on the categorized protocol type.

In accordance with an exemplary embodiment, for capturing the at least one metric, the processor may be further configured to capture at least one key performance indicator metric from the executed at least one synthetic workflow; associate the at least one key performance indicator metric with the at least one service call; and persist, in a repository, the at least one key performance indicator metric and a result of the associating together with the at least one service call.

In accordance with an exemplary embodiment, the at least one key performance indicator metric may include at least one from among a transaction performance metric that relates to the synthetic transaction and a system performance metric that relates to a corresponding downstream system.

In accordance with an exemplary embodiment, the at least one request may include a predetermined time interval to automatically generate the at least one service call, the predetermined time interval may relate to a user setting that is received via the graphical user interface.

In accordance with an exemplary embodiment, the processor may be further configured to capture the at least one metric at each downstream node that corresponds to the at least one service call.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
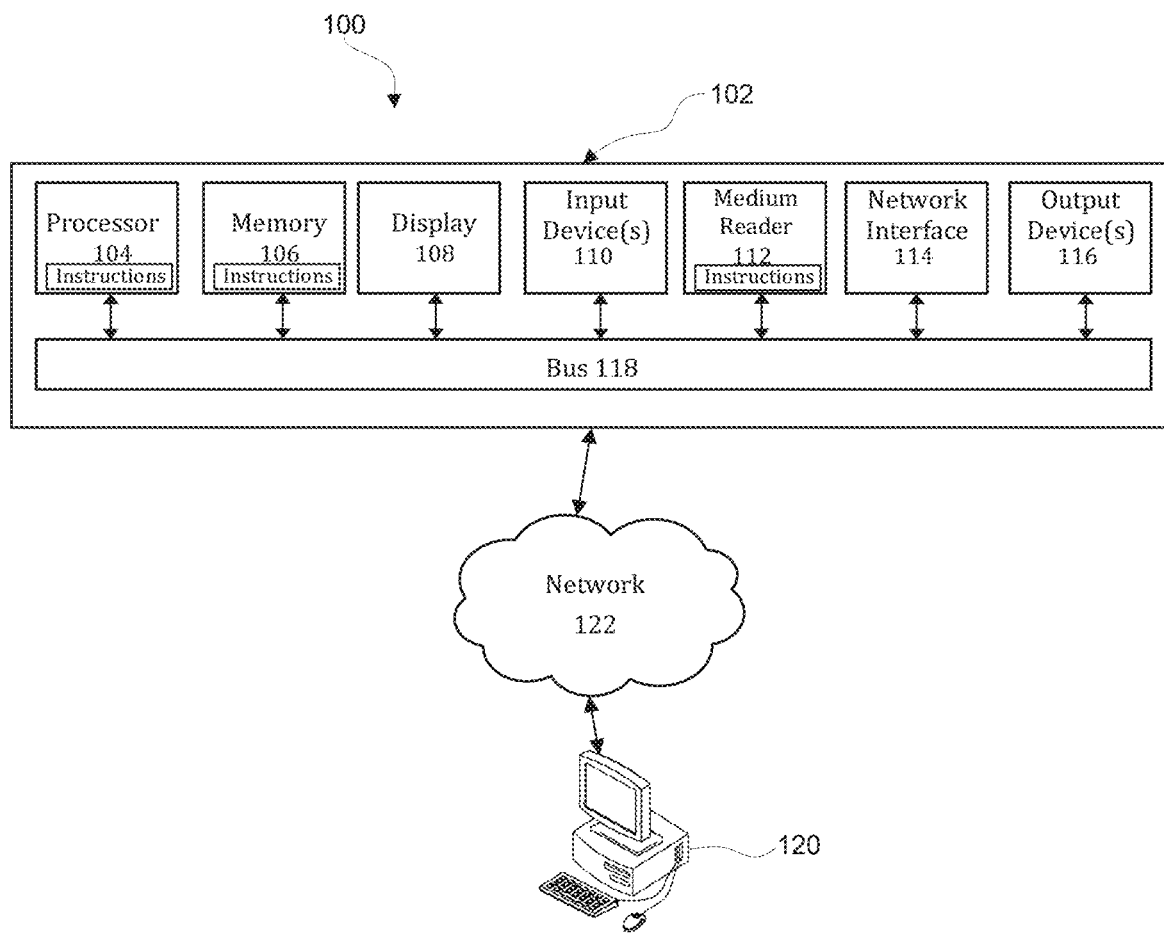
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing end-to-end monitoring of an application by using synthetic service calls and key performance indicators.

Figure 2:
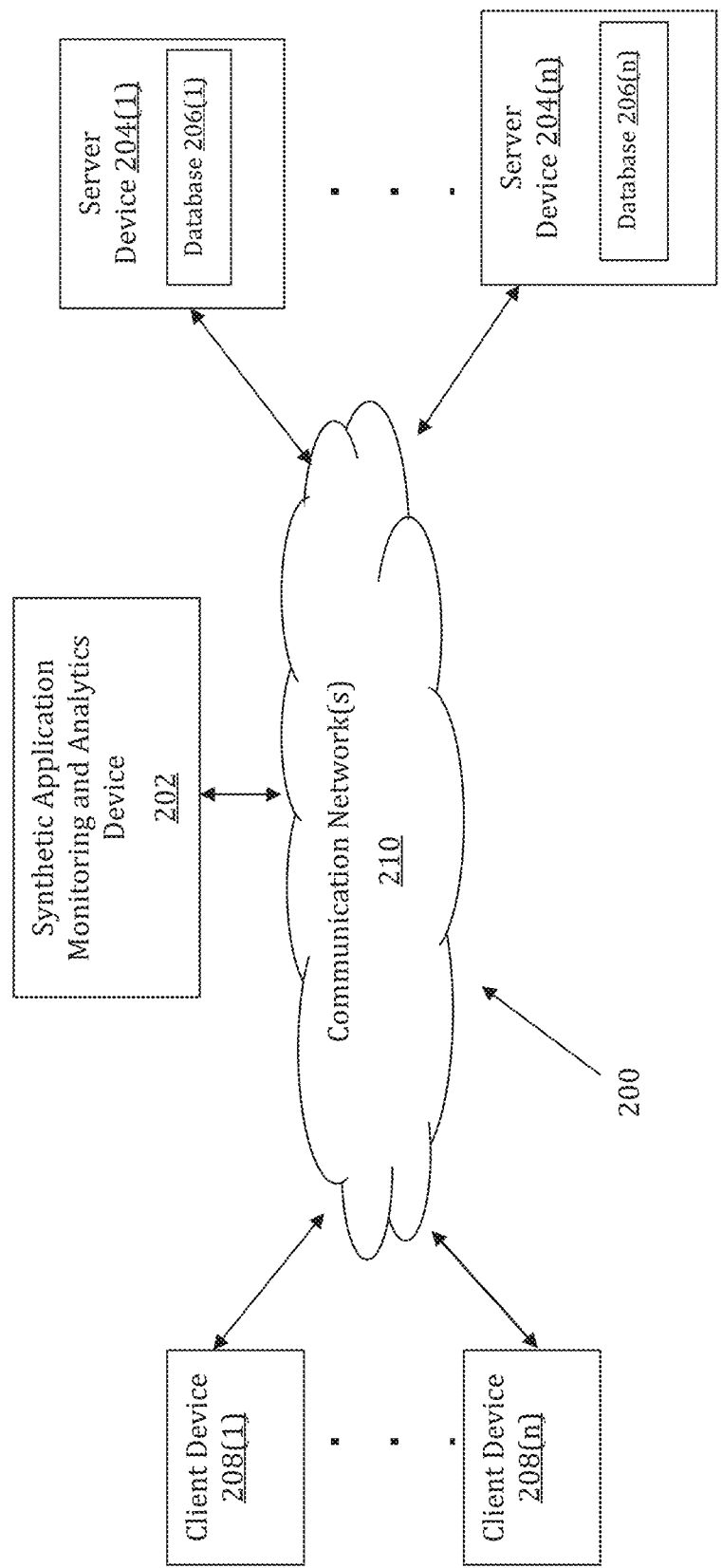
FIG. 2 illustrates an exemplary diagram of a network environment.

Referring to FIG. 2, a schematic of an exemplary network environment 200 for implementing a method for providing end-to-end monitoring of an application by using synthetic service calls and key performance indicators is illustrated. In an exemplary embodiment, the method is executable on any networked computer platform, such as, for example, a personal computer (PC).

The method for providing end-to-end monitoring of an application by using synthetic service calls and key performance indicators may be implemented by a Synthetic Application Monitoring and Analytics (SAMA) device 202. The SAMA device 202 may be the same or similar to the computer system 102 as described with respect to FIG. 1.

The SAMA device 202 may store one or more applications that can include executable instructions that, when executed by the SAMA device 202, cause the SAMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SAMA device 202 itself, may be located in virtual server(s) running in a cloud-based computing environment rather than being tied to one or more specific physical network computing devices. Also, the application(s) may be running in one or more virtual machines (VMs) executing on the SAMA device 202. Additionally, in one or more embodiments of this technology, virtual machine(s) running on the SAMA device 202 may be managed or supervised by a hypervisor.

In the network environment 200 of FIG. 2, the SAMA device 202 is coupled to a plurality of server devices 204(1)-204(n) that hosts a plurality of databases 206(1)-206(n), and also to a plurality of client devices 208(1)-208(n) via communication network(s) 210. A communication interface of the SAMA device 202, such as the network interface 114 of the computer system 102 of FIG. 1, operatively couples and communicates between the SAMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SAMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SAMA devices that efficiently implement a method for providing end-to-end monitoring of an application by using synthetic service calls and key performance indicators.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SAMA device 202 may be a standalone device or integrated with one or more other devices or apparatuses, such as one or more of the server devices 204(1)-204(n), for example. In one particular example, the SAMA device 202 may include or be hosted by one of the server devices 204(1)-204(n), and other arrangements are also possible. Moreover, one or more of the devices of the SAMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SAMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to requests, application information, service calls, synthetic transactions, synthetic workflows, performance metrics, predetermined thresholds, machine learning models, predicted factors, and key performance indicators.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the SAMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the SAMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the SAMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SAMA device 202, the server devices 204(1)-204(n), or the client devices 208(1)-208(n), for example, may be configured to operate as virtual instances on the same physical machine. In other words, one or more of the SAMA device 202, the server devices 204(1)-204(n), or the client devices 208(1)-208(n) may operate on the same physical device rather than as separate devices communicating through communication network(s) 210. Additionally, there may be more or fewer SAMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
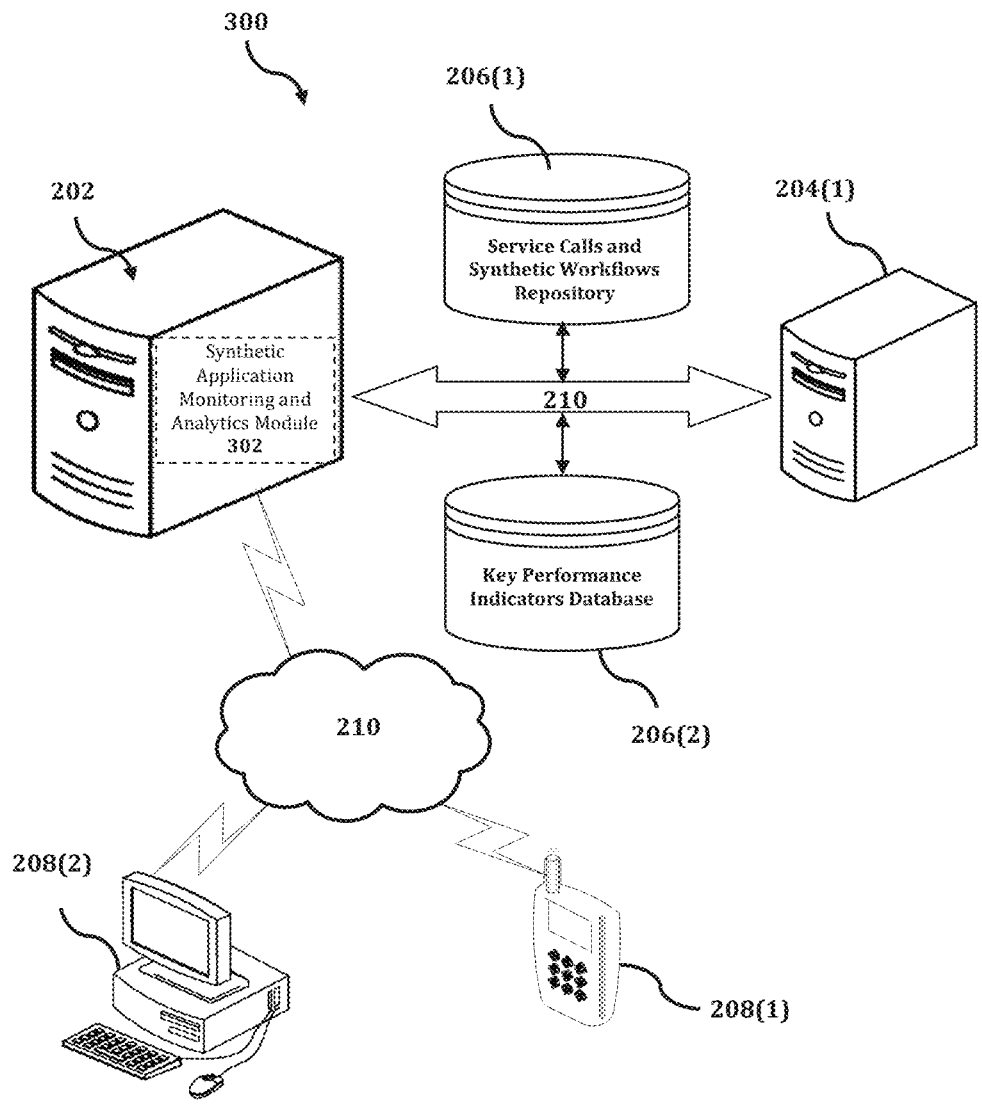
FIG. 3 shows an exemplary system for implementing a method for providing end-to-end monitoring of an application by using synthetic service calls and key performance indicators.

The SAMA device 202 is described and shown in FIG. 3 as including a synthetic application monitoring and analytics module 302, although it may include other rules, policies, modules, databases, or applications, for example. As will be described below, the synthetic application monitoring and analytics module 302 is configured to implement a method for providing end-to-end monitoring of an application by using synthetic service calls and key performance indicators.

An exemplary process 300 for implementing a mechanism for providing end-to-end monitoring of an application by using synthetic service calls and key performance indicators by utilizing the network environment of FIG. 2 is shown as being executed in FIG. 3. Specifically, a first client device 208(1) and a second client device 208(2) are illustrated as being in communication with SAMA device 202. In this regard, the first client device 208(1) and the second client device 208(2) may be "clients" of the SAMA device 202 and are described herein as such. Nevertheless, it is to be known and understood that the first client device 208(1) and/or the second client device 208(2) need not necessarily be "clients" of the SAMA device 202, or any entity described in association therewith herein. Any additional or alternative relationship may exist between either or both of the first client device 208(1) and the second client device 208(2) and the SAMA device 202, or no relationship may exist.

Further, SAMA device 202 is illustrated as being able to access a service calls and synthetic workflows repository 206(1) and a key performance indicators database 206(2). The synthetic application monitoring and analytics module 302 may be configured to access these databases for implementing a method for providing end-to-end monitoring of an application by using synthetic service calls and key performance indicators.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SAMA device 202 via broadband or cellular communication. Of course, these embodiments are merely exemplary and are not limiting or exhaustive.

Upon being started, the synthetic application monitoring and analytics module 302 executes a process for providing end-to-end monitoring of an application by using synthetic service calls and key performance indicators. An exemplary process for providing end-to-end monitoring of an application by using synthetic service calls and key performance indicators is generally indicated at flowchart 400 in FIG. 4.

Figure 4:
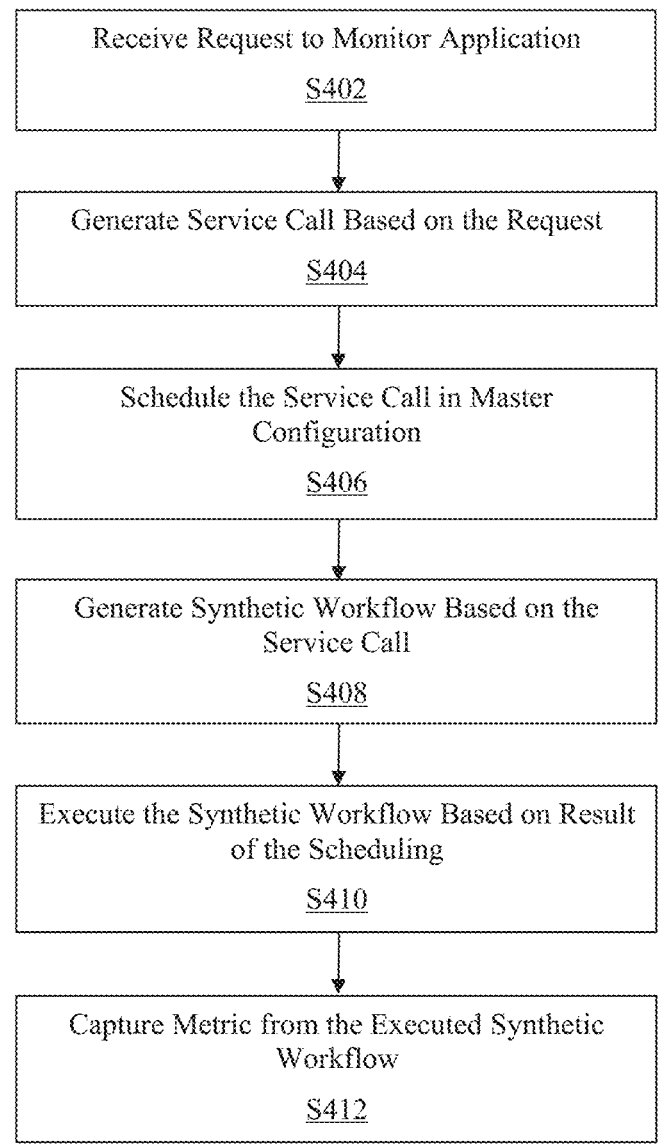
FIG. 4 is a flowchart of an exemplary process for implementing a method for providing end-to-end monitoring of an application by using synthetic service calls and key performance indicators.

In the process 400 of FIG. 4, at step S402, a request to monitor an application may be received via a graphical user interface. The request may include information relating to the application. In an exemplary embodiment, the graphical user interface may relate to a type of user interface such as, for example, a portal through which users interact with electronic devices via visual indicator representations. The graphical user interface may correspond to a graphical representation of customer centric transactions.

In another exemplary embodiment, the graphical user interface may include grouping information and summarization information based on at least one from among a product, an area product, a customer feature, and a critical transaction. For example, the graphical user interface may provide information for a system health check based on product, area product, customer journey, critical transactions for availability, and latency at each down stream component. In another exemplary embodiment, the graphical user interface may include graphical elements, which visually represents information. For example, the graphical user interface may display ongoing major incidents and known changes together with correlated red and/or amber graphical elements that visually represents alerts.

In another exemplary embodiment, the request may relate to instructions to monitor the application. The request may correspond to instruction that is given to a computing device to provide information and/or perform a function. In another exemplary embodiment, the request may include information that relates to the application such as, for example, application identification information. The application identification information may correspond with an associated identifier of the application. For example, the information may include an identifier that corresponds to a specific application in a choreography when testing of the specific application is desired.

In another exemplary embodiment, the request may include a predetermined time interval to automatically generate a service call. For example, the request may include instructions to automatically generate the service call once every five minutes. The predetermined time interval may relate to a user setting that is received via the graphical user interface. Automatic generation of the service call based on a predetermined time interval may enable functionalities such as, for example, automated synthetic monitoring of the application.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, a service call may be generated based on the request. The service call may relate to a synthetic transaction in a master configuration. In an exemplary embodiment, the service call may be onboarded via the graphical user interface. For example, a predeveloped service call may be onboarded by a developer to specifically test a particular application. The onboarding of the predeveloped service call may enable manual mapping of levels such as, for example, a product level, an area product level, a customer feature level, and a critical transaction level. Additionally, the onboarding of the predeveloped service call may enable on demand monitoring of the application according to a user preference.

In another exemplary embodiment, the service call may relate to a command to execute a service subroutine based on information in the request. The service call may be directed to the application being monitored and may include instructions that are specific to the application. For example, when an account creation application is being monitored, the service call may include instructions to create a new user account. In another exemplary embodiment, the service call may include information necessary to perform the instructed function. For example, the service call with instructions to create a new user account may include necessary account creation information such as a name and an assigned user identifier.

In another exemplary embodiment, the information necessary to perform the instructed function may include synthetic transaction information. The synthetic transaction information may correspond to artificially generated information that is usable by the application. The synthetic transaction information may not relate to a real-world transaction. In another exemplary embodiment, the synthetic transaction information may be randomly generated based on the request. For example, a name may be randomly generated based on linguistic guidelines. In another exemplary embodiment, the synthetic transaction information may be predetermined based on a user preference. For example, a name that is specifically designated for testing purposes may be used in the synthetic transaction to facilitate simple identification of testing data.

At step S406, the service call may be scheduled in the master configuration. In an exemplary embodiment, the service call may be schedule in the master configuration based on the request. Information in the request may dictate a preferred scheduling of the service call. For example, to monitor a particular function of the application, a specific scheduling schema may be desired. In another exemplary embodiment, the service call may be scheduled based on requirements of the service call. For example, the service call to monitor a particular application in a choreography may require specific scheduling to ensure that a desired functionality is monitored. As will be appreciated by a person of ordinary skill in the art, the master configuration of the application may relate to an application configuration that sets and/or modify an application operating environment in a master and node schema.

In another exemplary embodiment, scheduling the service call may include parsing the service call to identify a corresponding protocol type such as, for example, a simple object access protocol (SOAP), a representational state transfer (REST) protocol, and a message queue (MQ) protocol. The corresponding protocol type may be categorized to facilitate scheduling of the service call. Then, the service call may be scheduled in the master configuration based on the categorized protocol type.

At step S408, a synthetic workflow may be generated based on the service call. In an exemplary embodiment, the synthetic workflow may relate to an orchestrated pattern of activity that performs a desired function. The synthetic workflow may correspond to an orchestrated pattern of activity related to a functionality of the application that is performed by the application. For example, the synthetic workflow may correspond to steps that must be performed by the application to perform a desired function. The synthetic workflow may also correspond to an orchestrated pattern of activity related to a functionality of the application that is performed by other applications. For example, the synthetic workflow may correspond to steps that must be performed by other application to enable the application to perform a desired function.

In another exemplary embodiment, the synthetic workflow may correspond to an artificially generated workflow that is usable by the application. The synthetic workflow may or may not relate to a real-world workflow associated with the application. In another exemplary embodiment, the synthetic workflow may be randomly generated based on the service call. For example, a workflow may be generated to synthetically create a new user account based on the service call. In another exemplary embodiment, the synthetic workflow may be predetermined based on a user preference. For example, a workflow that is specifically designated for testing purposes may be used in the synthetic monitoring process to facilitate simple identification and collection of testing data.

At step S410, the synthetic workflow may be executed based on a result of the scheduling. In an exemplary embodiment, the scheduling of the service call may dictate how the synthetic workflow may be executed. For example, the scheduling of the service call may dictate that the synthetic workflow is executed based on a corresponding protocol type. In another exemplary embodiment, the scheduling of the service call may dictate when the synthetic workflow may be executed. For example, the scheduling of the service call may dictate that the synthetic workflow is executed at a certain time to ensure operability with other applications in the choreography.

At step S412, a metric may be captured from the executed synthetic workflow. The metric may be captured from the application as well as from downstream logs. In an exemplary embodiment, the metric may be captured at each downstream node that corresponds to the service call. Capturing of the metric at each downstream node may enable functionalities such as, for example, availability and latency checks for each downstream hop of a synthetic transaction. In another exemplary embodiment, the metric may be captured from a data stream via a listening component. The listening component may be integrated into the application. The listening component may also correspond to a listening application in the choreography. In another exemplary embodiment, the metric may be captured by using first-party tools as well as third-party tools.

In another exemplary embodiment, a key performance indicator (KPI) metric may be captured from the executed synthetic workflow. The KPI metric may be associated with the service call and persisted in a repository. The KPI metric and a result of the associating may be persisted together with the service call. Persisting of the KPI metric may enable functionalities such as, for example, reporting and documentation of availability and latency trends for a certain time period. In another exemplary embodiment, the KPI metric may include at least one from among a transaction performance metric that relates to the synthetic transaction and a system performance metric that relates to a corresponding downstream system.

In another exemplary embodiment, a performance metric for the application such as, for example, an availability metric and a latency metric may be determined based on the captured metric. The performance metric may be compared with a predetermined threshold that is associated with the application. The predetermined threshold may relate to a standard deviation based on a user preference. A service ticket for the application may be generated based on a result of the comparison. For example, when the performance metric is beyond a predetermined threshold value associated with the application, a service ticket may be generated. In another exemplary embodiment, a problem card may be generated based on the result of the comparison. The problem card may include information that relates to at least one from among the performance metric, the application, and the predetermined threshold.

In another exemplary embodiment, the predetermined threshold may be dynamically determined for the application by using a model. The model may include at least one from among a machine learning model, a statistical model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, data that corresponds to the application may be aggregated. The data may include at least one from among known incident data and known change data. A predicted factor that contributes to generation of the service ticket may be determined by using the aggregated data. In another exemplary embodiment, the predicted factor may be determined by using the aggregated data and a machine learning model consistent with disclosures in the present application.

In another exemplary embodiment, an alert may be generated when the service ticket is generated. The alert may include information that relates to at least one from among the performance metric, the application, the predetermined threshold, and the predicted factor. An administrator such as, for example, a support team that is associated with the application may be identified. The alert may be transmitted to the identified administrator via an application programming interface (API) such as, for example, an event API. In another exemplary embodiment, the API may be utilized to expose synthetic check for other services to call and to trigger synthetic transactions. Continuous integration and/or continuous deployment (CI/CD) pipelines may utilize the API to call synthetic checks for validation of pre-deployment as well as post deployment applications. The synthetic checks may be used to guide rollback decision making.

Figure 5:
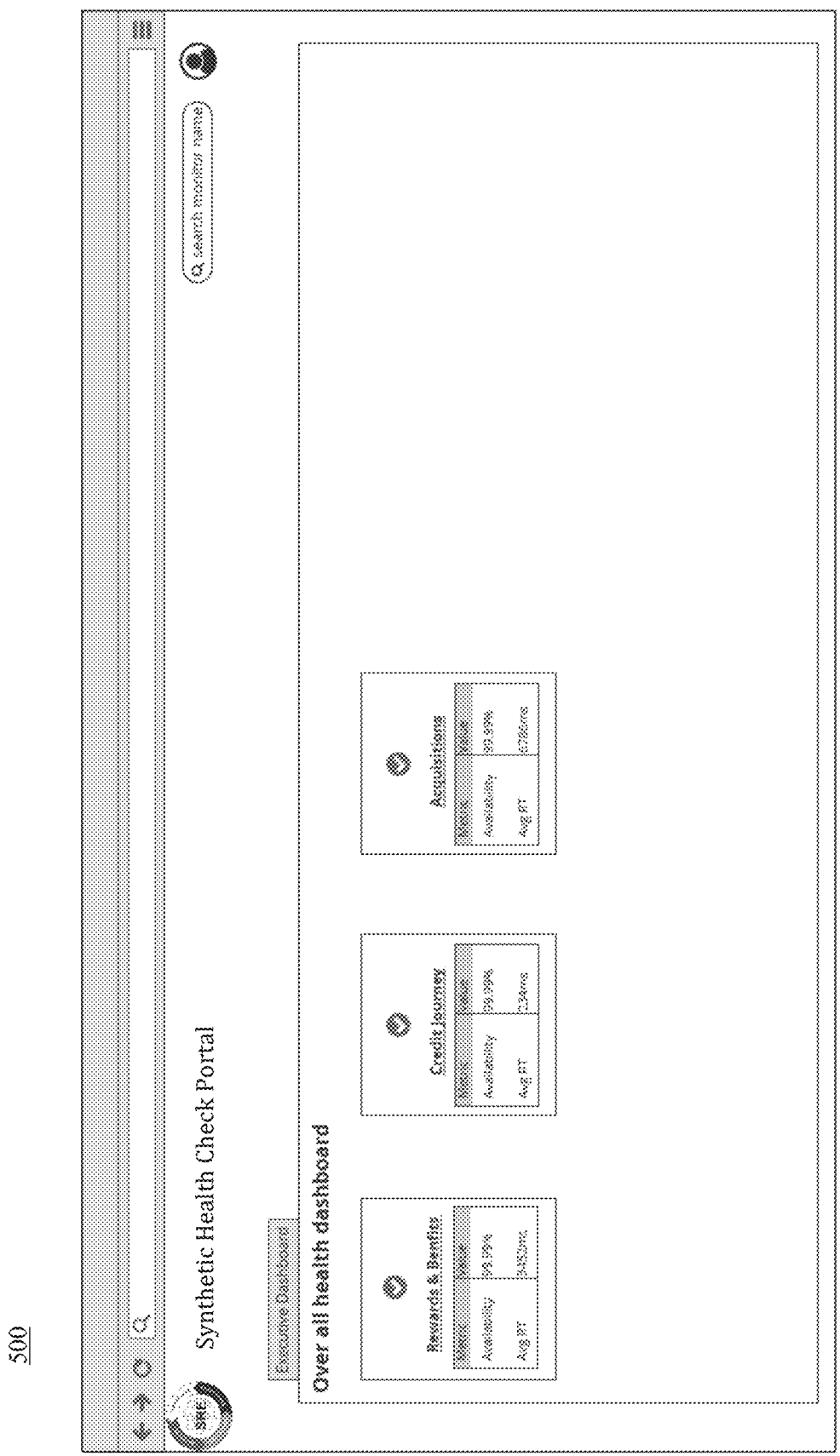
FIG. 5 is a screen shot of a wire-frame that illustrates a graphical user interface that is usable for implementing a method for providing end-to-end monitoring of an application by using synthetic service calls and key performance indicators, according to an exemplary embodiment.

FIG. 5 is a screen shot 500 of a wireframe that illustrates a graphical user interface that is usable for implementing a method for providing end-to-end monitoring of an application by using synthetic service calls and key performance indicators, according to an exemplary embodiment. In FIG. 5, a synthetic health check portal is provided to graphically display results corresponding to an executed synthetic monitoring process consistent with disclosures in the present application.

As illustrated in FIG. 5, the synthetic health check portal may relate to a web portal that is specifically designed to bring information from diverse sources together in a uniform way. The web portal may include a graphical user interface that is displayable via a web browser. The synthetic health check portal may include dashboards that are personalized for a specific user. In an exemplary embodiment, a claims-based access-control authorization model such as, for example, an active directory federation services (ADFS) model may be used to maintain application security and to implement federated identity services. The synthetic health check portal may also include a search bar with a text entry field that is configured to receive an input from a user. The search bar may be used to enable searching capabilities such as, for example, directly tracking a specific transaction.

The dashboards in the synthetic health check portal may include an overall health dashboard. The overall health dashboard my visually display performance information for a plurality of application networks such as, for example, a rewards and benefits application network, a credit journey application network, and an acquisitions application network. For each of the application networks, information such as, for example, a metric type and a corresponding metric value may be displayed on the overall health dashboard. The metric type may include an availability metric and an average response time metric.

Figure 6:
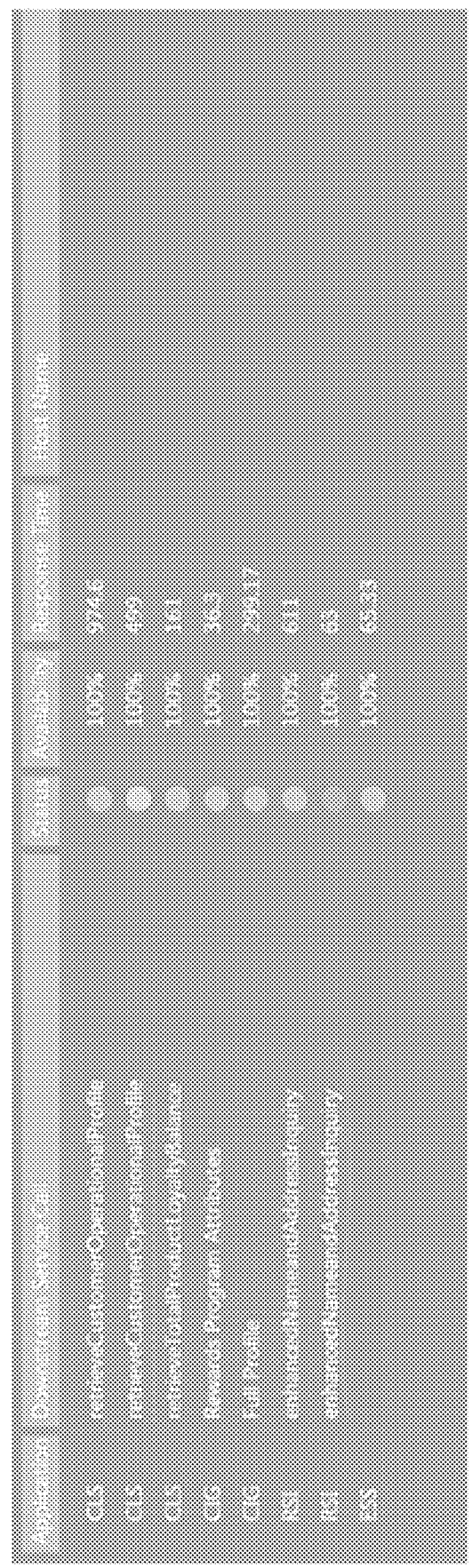
FIG. 6 is a screen shot that illustrates a graphical user interface that is usable for implementing a method for providing end-to-end monitoring of an application by using synthetic service calls and key performance indicators, according to an exemplary embodiment.

FIG. 6 is a screen shot 600 that illustrates a graphical user interface that is usable for implementing a method for providing end-to-end monitoring of an application by using synthetic service calls and key performance indicators, according to an exemplary embodiment. In FIG. 6, a graphical user interface is provided to graphically display results corresponding to an executed synthetic monitoring process consistent with disclosures in the present application.

As illustrated in FIG. 6, the results may be displayed in a tabular format, which presents information in rows and columns. The column headers may include an "Application" heading, a "Downstream Service Call" heading, a "Status" heading, an "Availability" heading, a "Response Time" heading, and a "Hostname" heading. The graphical user interface may include graphical elements such as, for example, alert circles which are color coded to visually represent a level of urgency. For example, for major incidents and significant changes, the alert circles may display urgency by using red and/or amber colored circles in the status column.

Accordingly, with this technology, an optimized process for providing end-to-end monitoring of an application by using synthetic service calls and key performance indicators is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing end-to-end monitoring of an application, the method being implemented by at least one processor, the method comprising:
receiving, by the at least one processor via a graphical user interface, at least one request to monitor the application, the at least one request including information relating to the application;

generating, by the at least one processor, at least one service call based on the at least one request, the at least one service call relating to a synthetic transaction in a master configuration;

scheduling, by the at least one processor, the at least one service call in the master configuration;

generating, by the at least one processor, at least one synthetic workflow based on the at least one service call;

executing, by the at least one processor, the at least one synthetic workflow based on a result of the scheduling;

capturing, by the at least one processor, at least one metric from the executed at least one synthetic workflow;

determining, by the at least one processor, at least one performance metric for the application based on the at least one captured metric;

comparing, by the at least one processor, the at least one performance metric with at least one predetermined threshold that is associated with the application,
wherein the at least one predetermined threshold is dynamically determined for the application by using at least one model; and
wherein the at least one model includes at least one from among a machine learning model, a statistical model, a mathematical model, a process model, and a data model; and generating, by the at least one processor, at least one service ticket for the application based on a result of the comparison.

2. The method of claim 1, further comprising:
aggregating, by the at least one processor, data that corresponds to the application, the data including at least one from among known incident data and known change data; and
determining, by the at least one processor using the data, at least one predicted factor that contributes to generation of the at least one service ticket.

3. The method of claim 2, further comprising:
generating, by the at least one processor, at least one alert when the at least one service ticket is generated, the at least one alert including information that relates to at least one from among the at least one performance metric, the application, the at least one predetermined threshold, and the at least one predicted factor;
identifying, by the at least one processor, at least one administrator associated with the application; and
transmitting, by the at least one processor via an application programming interface, the at least one alert to the at least one administrator.

4. The method of claim 1, wherein scheduling the at least one service call further comprises:
parsing, by the at least one processor, the at least one service call to identify a corresponding protocol type;
categorizing, by the at least one processor, the corresponding protocol type; and
scheduling, by the at least one processor, the at least one service call in the master configuration based on the categorized protocol type.

5. The method of claim 1, wherein capturing the at least one metric further comprises:
capturing, by the at least one processor, at least one key performance indicator metric from the executed at least one synthetic workflow;
associating, by the at least one processor, the at least one key performance indicator metric with the at least one service call; and
persisting, by the at least one processor in a repository, the at least one key performance indicator metric and a result of the associating together with the at least one service call.

6. The method of claim 5, wherein the at least one key performance indicator metric includes at least one from among a transaction performance metric that relates to the synthetic transaction and a system performance metric that relates to a corresponding downstream system.

7. The method of claim 1, wherein the at least one request includes a predetermined time interval to automatically generate the at least one service call, the predetermined time interval relating to a user setting that is received via the graphical user interface.

8. The method of claim 1, wherein the at least one metric is captured at each downstream node that corresponds to the at least one service call.

9. A computing device configured to implement an execution of a method for providing end-to-end monitoring of an application, the computing device comprising:
a processor;
a memory; and
a communication interface coupled to each of the processor and the memory,
wherein the processor is configured to:
receive, via a graphical user interface, at least one request to monitor the application, the at least one request including information relating to the application;
generate at least one service call based on the at least one request, the at least one service call relating to a synthetic transaction in a master configuration;
schedule the at least one service call in the master configuration;
generate at least one synthetic workflow based on the at least one service call;
execute the at least one synthetic workflow based on a result of the scheduling;
capture at least one metric from the executed at least one synthetic workflow;
determine at least one performance metric for the application based on the at least one captured metric;
compare the at least one performance metric with at least one predetermined threshold that is associated with the application,
wherein the processor is further configured to dynamically determine the at least one predetermined threshold for the application by using at least one model; and
wherein the at least one model includes at least one from among a machine learning model, a statistical model, a mathematical model, a process model, and a data model; and
generate at least one service ticket for the application based on a result of the comparison.

10. The computing device of claim 9, wherein the processor is further configured to:
aggregate data that corresponds to the application, the data including at least one from among known incident data and known change data; and
determine, by using the data, at least one predicted factor that contributes to generation of the at least one service ticket.

11. The computing device of claim 10, wherein the processor is further configured to:
- generate at least one alert when the at least one service ticket is generated, the at least one alert including information that relates to at least one from among the at least one performance metric, the application, the at least one predetermined threshold, and the at least one predicted factor;
- identify at least one administrator associated with the application; and
- transmit, via an application programming interface, the at least one alert to the at least one administrator.

12. The computing device of claim 9, wherein, for scheduling the at least one service call, the processor is further configured to:
- parse the at least one service call to identify a corresponding protocol type;
- categorize the corresponding protocol type; and
- schedule the at least one service call in the master configuration based on the categorized protocol type.

13. The computing device of claim 9, wherein, for capturing the at least one metric, the processor is further configured to:
- capture at least one key performance indicator metric from the executed at least one synthetic workflow;
- associate the at least one key performance indicator metric with the at least one service call; and
- persist, in a repository, the at least one key performance indicator metric and a result of the associating together with the at least one service call.

14. The computing device of claim 13, wherein the at least one key performance indicator metric includes at least one from among a transaction performance metric that relates to the synthetic transaction and a system performance metric that relates to a corresponding downstream system.

15. The computing device of claim 9, wherein the at least one request includes a predetermined time interval to automatically generate the at least one service call, the predetermined time interval relating to a user setting that is received via the graphical user interface.

16. The computing device of claim 9, wherein the processor is further configured to capture the at least one metric at each downstream node that corresponds to the at least one service call.

* * * * *